United States Patent [19]

Specht

[11] Patent Number: 5,527,500
[45] Date of Patent: Jun. 18, 1996

[54] METHOD OF FORMING A FRAMED PANEL UTILIZING TENSIONING BY HEAT SHRINKING

[75] Inventor: Paul Specht, Wilmette, Ill.

[73] Assignee: The Tensar Corporation, Atlanta, Ga.

[21] Appl. No.: 253,127

[22] Filed: Jun. 2, 1994

[51] Int. Cl.$^6$ ............................. B29C 44/12; B29C 61/02
[52] U.S. Cl. ................. 264/46.4; 264/252; 264/288.4; 264/288.8; 264/342 R
[58] Field of Search ................. 264/342 R, 342 RE, 264/252, 288.4, 288.8, 46.4

[56] References Cited

U.S. PATENT DOCUMENTS

| | | | |
|---|---|---|---|
| 2,681,294 | 6/1954 | Beguin | 118/300 |
| 3,523,994 | 8/1970 | Shockey | 264/252 |
| 4,140,826 | 2/1979 | Liu | 264/288.8 |
| 4,536,429 | 8/1985 | Mercer | 264/288.8 |
| 4,584,155 | 4/1986 | Zanella | 264/252 |
| 4,590,029 | 5/1986 | Mercer | 264/288.8 |
| 4,618,385 | 10/1986 | Mercer | 264/288.8 |
| 4,695,420 | 9/1987 | Grawey et al. | 264/342 R |
| 4,756,946 | 7/1988 | Mercer | 264/288.8 |
| 4,769,100 | 9/1988 | Short et al. | 156/212 |
| 5,034,077 | 7/1991 | Pata | 264/342 R |
| 5,132,148 | 7/1992 | Reafler | 427/393.5 |

*Primary Examiner*—Allan R. Kuhns
*Attorney, Agent, or Firm*—Jacobson, Price, Holman & Stern

[57] ABSTRACT

A simple and inexpensive method and apparatus for molding a peripheral frame around a sheet or grid of thermoplastic material to produce a framed panel. A peripheral frame, preferably of structural foam or the like, is injection molded about a thermoplastic sheet or grid of panel-forming material which has been previously drawn or stretched at a temperature which orients the molecules of the polymer, i.e., below the glass transition temperature of the polymer, $T_g$. Either during the frame molding process, or subsequent thereto, the panel-forming material is heated sufficiently to cause the material to shrink or revert toward its prestretched condition so as to tension the panel-forming material within the frame. Elastomeric sealing means are disclosed for sealing the mold during injection of the frame-forming material and locator fingers are provided to position a grid-like panel-forming material prior to initiation of the molding process. By the utilization of structural foam molding techniques, a panel of thermoplastic material may be integrally-molded and tensioned within a rigid frame to produce a framed panel of any size for use as a barrier, a fence, a guard, a closure, a seat or bedding support, a filter member or other such applications.

56 Claims, 13 Drawing Sheets

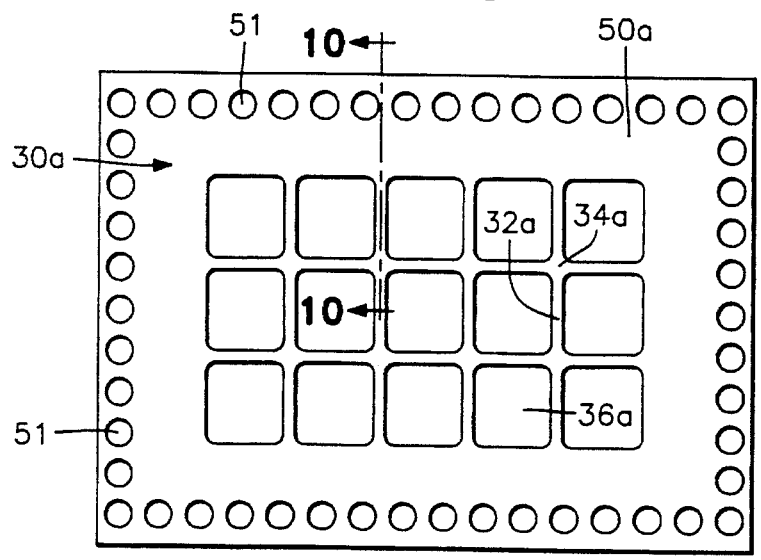
FIG. 9
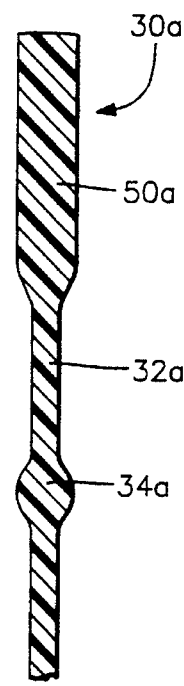
FIG. 10
FIG. 11
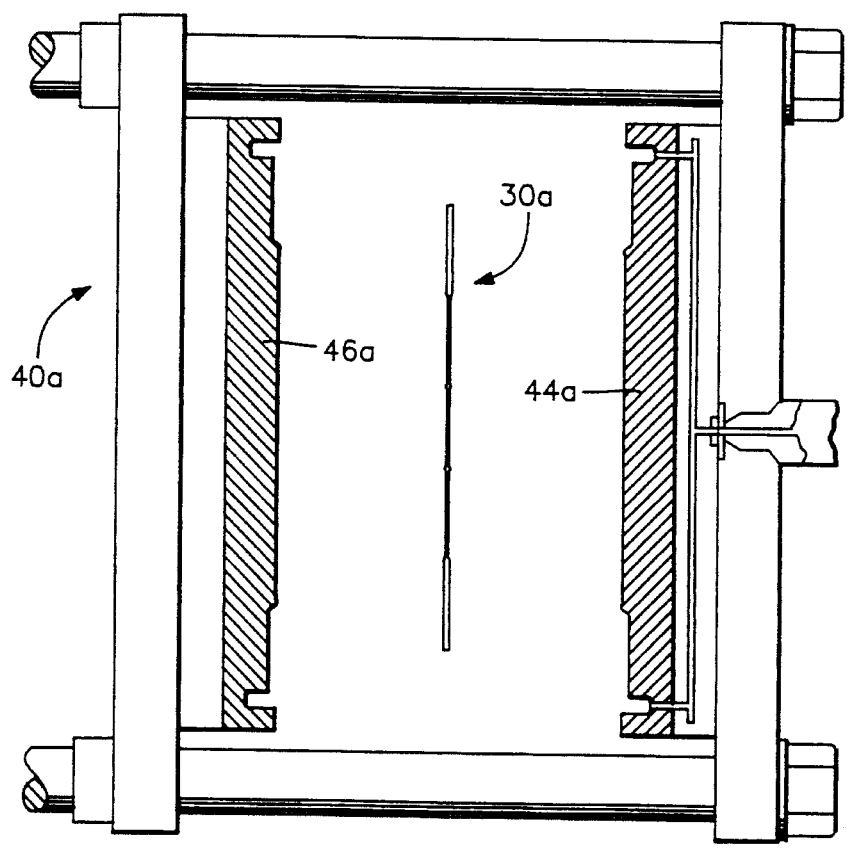

METHOD OF FORMING A FRAMED PANEL UTILIZING TENSIONING BY HEAT SHRINKING

FIELD OF THE INVENTION

This invention relates to a panel framing system and relates more particularly to a method and apparatus for molding a peripheral frame around a sheet or grid of thermoplastic panel-forming material, and the products resulting therefrom which find particular utility as permanent and portable fence sections, barriers, guards, closures, seat and bedding supports, frames for filter elements and the like.

BACKGROUND OF THE INVENTION

There are many different types of fencing materials commercially available, ranging from various forms of wooden fences comprising posts and stringers, to metal fences made from chain link, wire mesh or barbed wire, to plastic or polymeric grids such as shown in Mercer U.S. Pat. No. 4,374,798, ("the '798 patent") the subject matter of which is incorporated here in its entirety by reference. The construction of fences from such stock materials is generally accomplished at the site and is very time consuming and labor intensive.

Preformed panels of fence-forming materials are also available, reducing on-site construction time and enhancing the versatility, portability and stability of the resultant fence. For example, portable fence panels are disclosed in Tabler U.S. Pat. No. 5,184,800, the subject matter of which is also incorporated herein in its entirety by reference. In that patent, a grid material framed in wood is interwoven with steel bars secured to opposite sides of the panel by bolts to hold the grid material in tension. While such a system provides a unique and highly desirable snow fence, there are many fencing applications where the disclosed construction would not be appropriate because of the cost and weight of the materials utilized.

Other preformed panels commercially available are relatively expensive to manufacture or install, involve a two-piece frame joining process, are aesthetically unacceptable, offer little flexibility in terms of modular joining relationships, or are unable to withstand the environmental and other external forces to which they are commonly subjected in use.

Thus, there is a need for a panel framing system which obviates the attendant disadvantages of the prior art techniques and which produces framed panel members which are highly versatile having utility in a wide variety of applications, from barrier, fencing and closure applications, to guards to prevent materials from falling off shelves or conveyor belts, to even such diverse uses as seat supports, bedding supports and filter frames.

SUMMARY OF THE INVENTION

It is a primary object of this invention to provide a simple and inexpensive method and apparatus for molding a peripheral frame around a sheet or grid or a sheet with alternating strips of solid and grid portions to produce a framed fencing panel or the like which overcomes the aforementioned disadvantages of currently available panel framing technology and the products formed thereby.

One problem associated with prior art preformed panels comprising a framed panel-forming material is the difficulty in tensioning the panel within the frame to provide structural rigidity and an aesthetically pleasing appearance. According to this invention, a peripheral frame, preferably of structural foam or the like, is injection molded about a thermoplastic sheet, grid, or other panel-forming material which has been previously drawn or stretched at a temperature which orients the molecules of the polymer, i.e., below the glass transition temperature of the polymer, $T_g$. Either during the frame molding process, or subsequent thereto, the panel-forming material is heated sufficiently to cause the material to shrink or revert toward its prestretched condition so as to tension the panel-forming material within the frame.

By the utilization of structural foam molding techniques, thermoplastic material may be integrally-molded and tensioned within a rigid frame to produce a framed panel of any size. Such products have a wide variety of potential applications such as in fencing, gates, barriers, guards, etc. where they will be oriented vertically in most applications. However, horizontal or even angular orientation for special needs such as in seating and bedding is also possible. The framed panels are easy and inexpensive to manufacture and install. Moreover, they are light-weight, yet durable and strong. Being formed substantially entirely of plastic they are not subject to environmental deterioration, have excellent dielectric characteristics and can be provided with most any color or combination of colors. If the framed panel is to be used, for example, as a snow fence on a ski hill or as a crowd control fence at a golf match the panel portion can be printed with a design or message for aesthetic or advertising purposes, particularly when it is formed of a sheet or film material.

The provision of a rigid T-shaped peripheral frame has been found to enable the use of unique connectors to attach panels to each other and/or other supporting elements such as posts, beams, walls or the like with simplified tools to thereby permit simple construction of a variety of free-standing, temporary or permanent structures.

The panel framing system also allows for a wide range of joining relationships—panels of different sizes may be connected together, they can be connected alongside or on top of each other, they may be turned at an angle or connected at an incline or decline to meet special needs such as following uneven terrain. The modularity and light weight of the system also increases efficiencies and economies with respect to erection, disassembly, handling, transportation, storage and the like.

Various panel-forming materials are suitable according to this invention depending upon the anticipated end use. A preferred grid material may be made according to the techniques disclosed in the above-identified '798 patent. Both uniaxially and biaxially oriented grid materials as disclosed therein when formed, for example, from a thermoplastic material such as polypropylene, polyethylene or polyester, will have the ability to revert toward their prestretched condition when heated to thereby tension the panel-forming material in the molded frame. However, for most applications, a biaxially oriented grid material (referred to herein as a "polygrid"), which will be biaxially tensioned when post-heated, is most appropriate.

Other pre-stretched materials will find applicability in the formation of framed panels according to this invention. For example, thermoplastic grid or net materials which have been produced by any of a wide variety of known techniques and drawn below $T_g$ for molecular orientation, can be molded and tensioned within a panel frame in the manner disclosed herein. Likewise, solid sheets, films or fabrics which have molecular orientation are useful panel-forming materials.

Moreover, the panel-forming material may be a combination of a sheet and grid-like material. For example, a polygrid may be specially formed with a diecut selvedge which has not been prestretched. A plurality of openings or apertures may be defined in the selvedge to improve the engagement of the injection molded frame-forming polymer with the panel in the final product.

Alternatively, the panel-forming material used may include openings which need not be located throughout the entire opening defined by the frame. For example, the panel-forming material may be a single sheet including alternating strips of grid material and strips of solid material for selected applications such as advertising where a brand name or logo appears on the solid strips.

The frame structure of this invention is sufficiently lightweight and inexpensive to function as a carrier for a filter element and can also be used for seat and bed support structures.

According to the instant invention, peripheral portions of any of the variety of panel-forming materials are captured within a frame-forming mold and a frame-forming polymer, such as a structural foam, molded about the peripheral portions of the panel-forming material to produce a rigid frame. With the use of a prestretched thermoplastic panel-forming material, either while still retained within the molding apparatus, or subsequent to removal therefrom, the panel-forming material may be heated to tension the same within the molded frame and cooled so as to retain its taut condition.

Unique elastomeric sealing means are provided according to the instant inventive concepts for use in an injection molding process to prevent escape of the frame-forming polymer where it joins to a polymeric grid-type panel. Adjustable locator fingers are also provided when a grid or net-type panel-forming material is to be utilized, to initially position the same in the mold with a slight tensioning toward the corners to thereby facilitate the molding operation and improve the final product. Alternatively, clamps are used for positioning sheets and fabrics.

The above and other objects of the invention, as well as many of the attendant advantages thereof, will become more readily apparent when reference is made to the following detailed description, taken in conjunction with the accompanying drawings.

BRIEF DESCRIPTION OF THE DRAWINGS

FIG. 9 is an elevational view similar to FIG. 1 of an alternative form of panel-forming material for use according to the instant inventive concepts having an apertured selvedge to enhance the securement of the panel within the injection molded frame:

FIG. 10 is an enlarged fragmentary cross-sectional view taken along line 10—10 of FIG. 9;

FIG. 11 is a view similar to FIG. 3 showing a modified form of injection molding apparatus which eliminates the elastomeric peripheral sealing means because of the inherent sealing of the mold elements with the solid portions of the selvedge of a panel-forming material such as shown in FIGS. 9 and 10;

FIG. 18 is a top plan view thereof, further illustrating how the connected panels can be secured to a support post or the like;

DETAILED DESCRIPTION OF THE PREFERRED EMBODIMENTS

Figure 1:
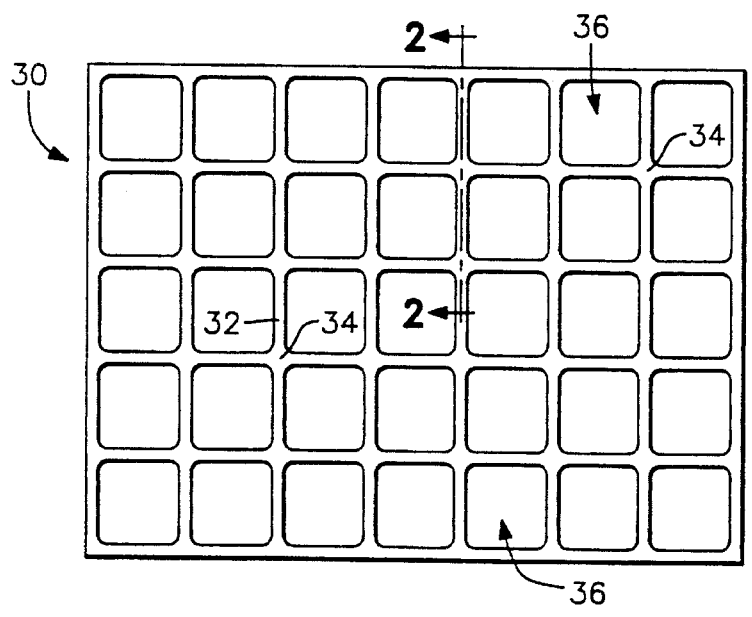
FIG. 1 is an elevational view of one form of grid material which can be used to make framed panels according to this invention.
Figure 2:
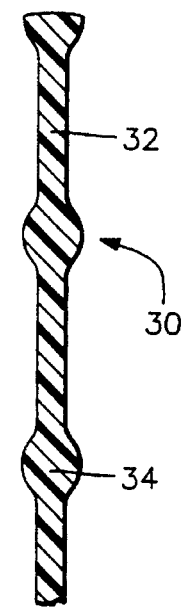
FIG. 2 is an enlarged fragmentary cross-sectional view taken along line 2—2 of FIG. 1.

In describing the preferred embodiments of the invention as illustrated in the drawings, specific terminology will be resorted to for the sake of clarity. However, the invention is not intended to be limited to the specific terms as selected, and it is to be understood that each specific term includes technical equivalents which operate in a similar manner to accomplish a similar purpose.

Although it is to be understood that the framed panels of this invention may have a wide variety of end uses, for convenience such products are shown and described herein primarily as used in fencing applications. Also, while the preferred embodiments hereof are described with reference to a biaxially oriented polymer grid panel-forming material such as is disclosed in the aforementioned '798 patent, or a modified form of such a material having an apertured selvedge, any thermoplastic material having molecularly oriented portions may be used to form the panel. Minor modifications to the method and apparatus obvious to those skilled in this art may be necessary when using alternate panel-forming materials without departing from the instant inventive concepts. For example, although the molding apparatus is shown herein as vertically oriented, and for a grid-like panel-forming material such an arrangement may be most appropriate, the apparatus can be disposed horizontally which may be more convenient for panel-forming materials in film or sheet form.

With reference now to the drawings in general, and to FIGS. 1–8 in particular, a first embodiment of the panel forming system of the instant invention is schematically illustrated. A polygrid 30 is provided which has been formed by biaxially stretching an apertured sheet of polypropylene or the like according to the teachings of the '798 patent to form molecularly oriented elongated strands 32 interconnected by unoriented or less oriented junctions 34 together defining a multiplicity of grid openings 36. As is well know to those skilled in this art, when thermoplastic materials of this type have been "cold" drawn, i.e., drawn below $T_g$, the molecules align or orient in the direction of stretch. Upon heating of such materials, they tend to shrink or revert back toward their prestretched state, a property utilized according to the instant inventive concepts to tension the panel-forming material in the frame as will be discussed in more detail hereinafter.

Figure 3:
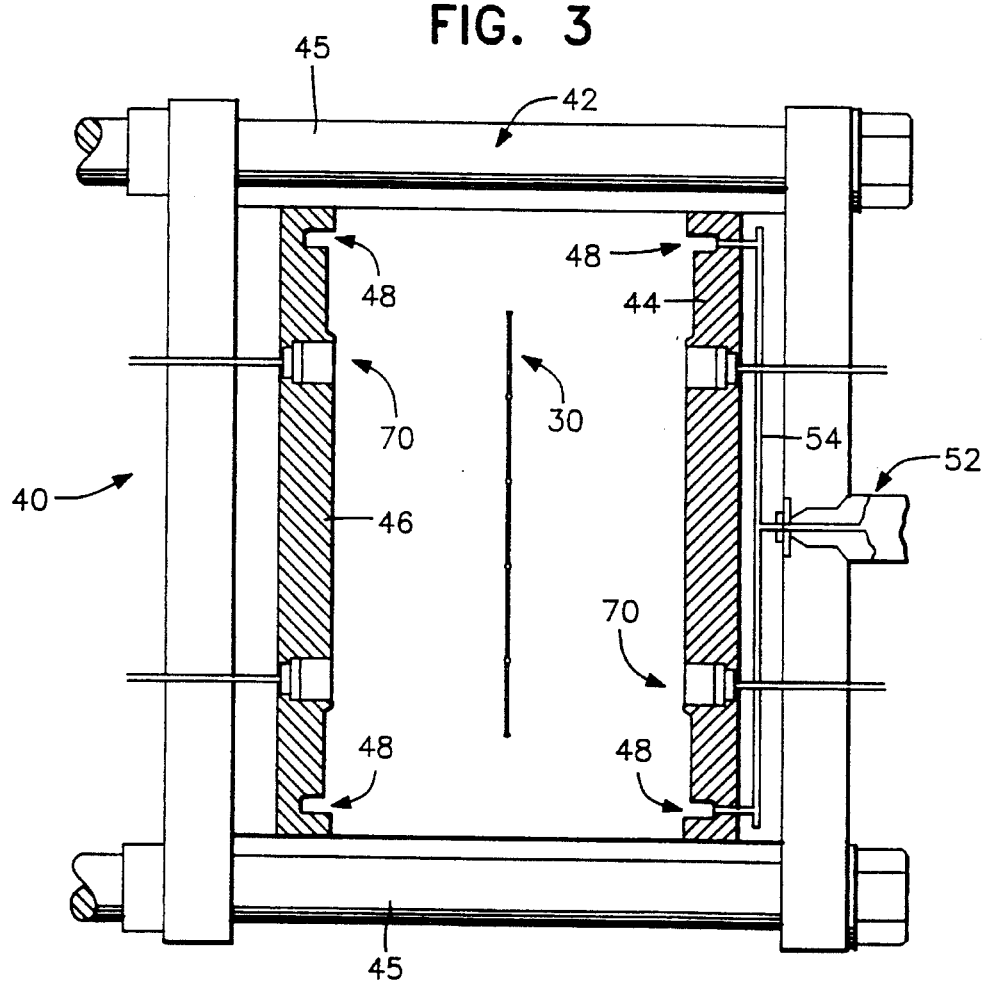
FIG. 3 schematically illustrates the first step in one embodiment of a panel framing process according to the instant inventive concepts illustrating the initial location of the panel-forming grid material between opposed mold members of an injection molding apparatus.
Figure 4:
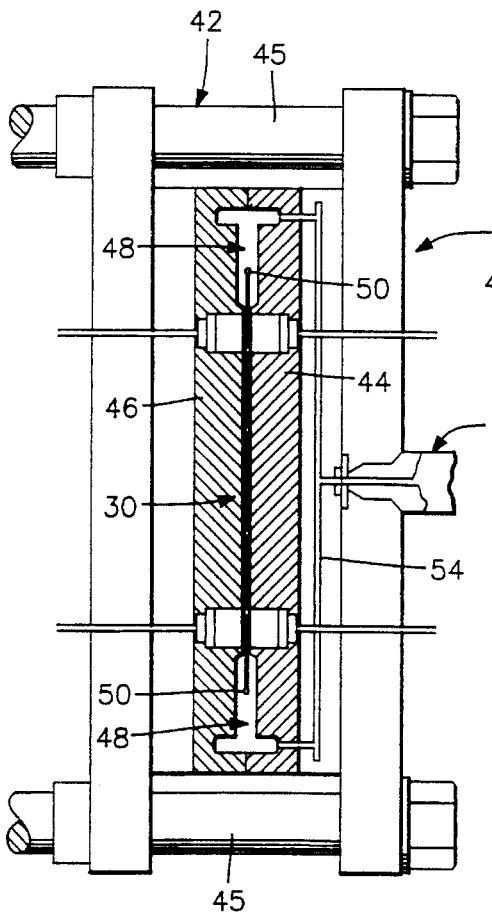
FIG. 4 is a view similar to FIG. 3 with the mold members closed, capturing peripheral portions of the grid material within the mold cavity.
Figure 5:
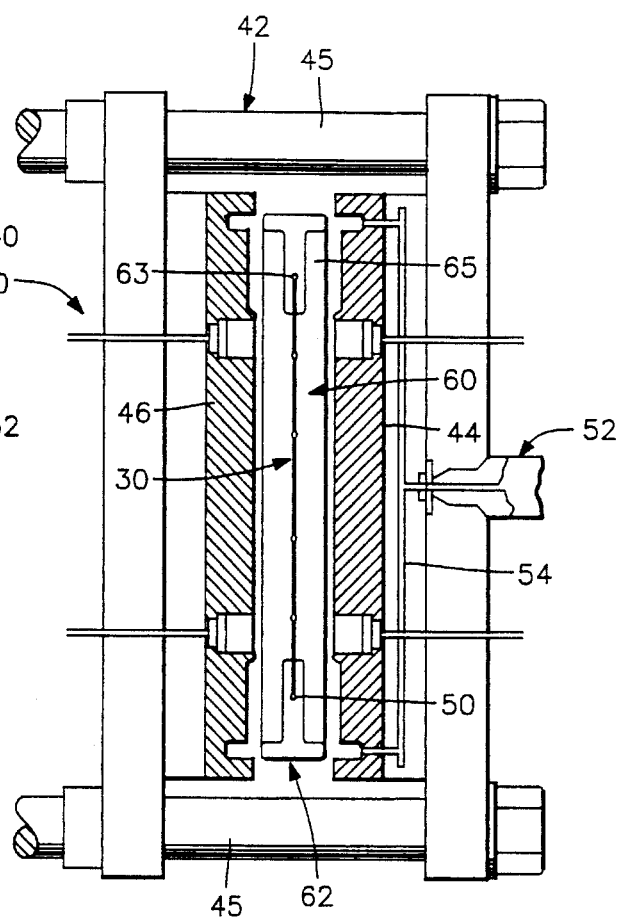
FIG. 5 illustrates the separation of the mold members and the formation of a T-shaped frame surrounding the panel-forming grid material.

FIGS. 3–5 schematically illustrate an injection molding apparatus designated generally by the reference numeral 40 comprising a frame 42 carrying a pair of mold members 44, 46, one or both of which may be movably mounted in the frame 42 to open and close the molding elements. In the embodiment shown, mold member 44 is fixed and mold member 46 is slidably supported on rods 45 for movement into and out of mating engagement with mold member 44 in any conventional manner. The polygrid 30 is schematically shown in FIG. 3 positioned between the spaced mold members 44, 46. When the mold members 44, 46 are closed as shown in FIG. 4, a mold cavity 48 is defined about the peripheral portions 50 of the polygrid 30. The shape of the mold cavity 48 may be varied to suit the particular end use of the framed panel, but a square or rectangular frame T-shaped in cross-section as shown has been found particularly desirable to provide rigidity and stability to the final product, and to readily enable interconnection of the panel to other panels and/or supporting members as will be explained in more detail hereafter.

With the mold members in mating engagement a molten frame-forming polymeric material is injected in a well known manner through a head schematically shown at 52 and runners 54 into the frame-forming mold cavity 48. The preferred frame-forming material is a structural foam, that is, an injection molded engineering plastic either pre-blended with a chemical blowing agent which, when heated, releases inert gas that disperses through the polymer melt, or into which an inert gas is introduced. When the gas/resin mixture is shot under pressure into the mold cavity 48, the gas expands within the plasticized material as it fills the mold, producing an internal cellular structure as well as a tough external skin at the mold face. Structural foams are well known and commercially available, for example, from General Electric as foamable grades of their LEXAN polycarbonate resins, NORYL thermoplastic resin and VALOX thermoplastic polyester resin. Further details of these resins and the structural foam process are found in The Handbook of Engineering Structural Foam published by General Electric, the subject matter of which is incorporated herein in its entirety by reference. Alternative frame-forming materials, foamed or otherwise, can be substituted for the structural foam, but it has been found that the structural foam provides a rigid frame capable of withstanding environmental and other external forces normally encountered in use.

Once the injection molding process has been completed and the frame-forming material set or hardened, the moveable mold member 46 is retracted and the framed panel 60 released from the injection molding apparatus 40. The framed panel 60 comprises a T-shaped peripheral frame 62 comprising a stem portion 63 within which is embedded the peripheral portions 50 of the polygrid 30, with the stem portion 63 being surrounded by a peripheral flange 65.

Figure 6:
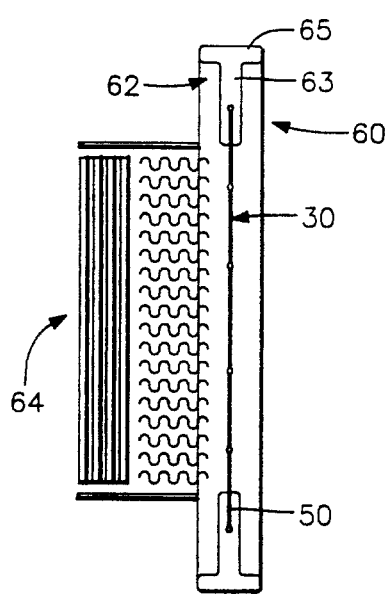
FIG. 6 schematically illustrates a post-heating step wherein the molecularly oriented portions of the thermoplastic grid material tend to shrink or revert toward their prestretched state, thereby tensioning the panel within the molded frame.

In order to tension the panel-forming polygrid 30 within the frame 62, heating means such as schematically shown at 64 in FIG. 6 are provided to heat the polygrid 30 to a temperature that will cause it to shrink or revert toward its prestretched state. When cooled as schematically shown at 66 in FIG. 7 the panel-forming polygrid 30 will retain its tensioned or taut condition to produce the ultimate framed panel illustrated in FIG. 8 where the peripheral portions 50 captured by the stem 63 of the frame 62 are shown in phantom for illustrative clarity.

Figure 7:
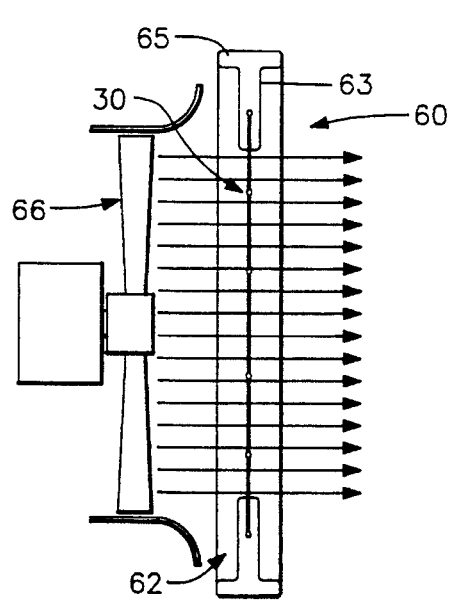
FIG. 7 illustrates the cooling of the tensioned grid material.
Figure 8:
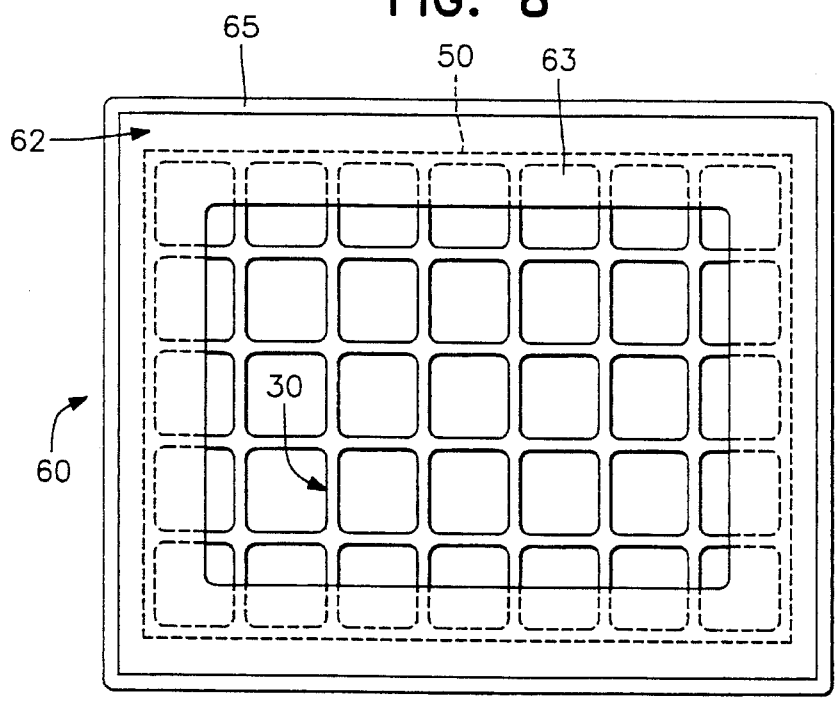
FIG. 8 is an elevational view of a framed panel produced according to the process of FIGS. 1–7 with the hidden peripheral portions of the grid material shown in phantom.

If necessary, a holding jig (not shown) may be provided for the framed panel 60 during the heating and cooling steps shown in FIGS. 6 and 7.

Figure 14:
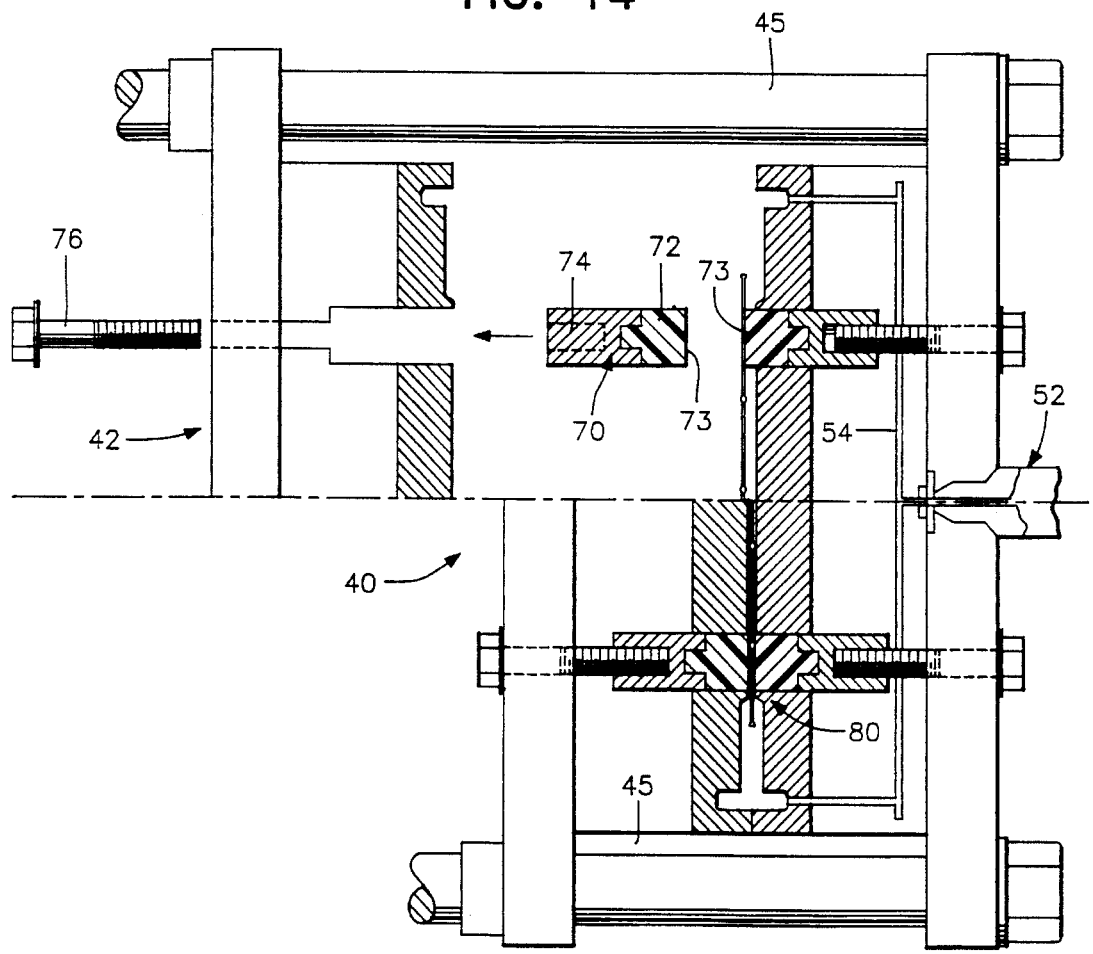
FIG. 14 is an enlarged view of the molding apparatus of FIG. 1 featuring the construction and operation of the elastomeric sealing means, with the upper section showing the mold members open and portions thereof exploded and partially in section for illustrative clarity, and the lower section showing the mold members closed.

When using an open grid or net-like panel-forming material such as the polygrid 30, the alternate strands 32 and apertures 36 of the peripheral portions 50 make sealing of the mold cavity 48 to preclude leakage of molten frame-forming material during the injection molding process difficult. Therefore, a unique sealing means designated generally by the reference numeral 70 is provided, the construction and utility of which is shown particularly in FIG. 14. In the upper portion of FIG. 14, the mold members 44, 46 are in their spaced or open position, and the elements forming the sealing means 70 are exploded and in section for illustrative clarity. The sealing means 70 comprises elastomeric sealing elements 72 made of rubber or the like carried by support members 74, fixed, as by bolts 76 or the like to portions of the frame 42. The elastomeric sealing elements 72 may be replaced from time to time, as necessary and extend peripherally around each of the mold members 44, 46 just inside of the portions defining the mold cavity 48.

The inner face portions 73 of the elastomeric sealing elements 72 extend slightly beyond the mating surfaces of the mold members 44, 46. When the mold members 44, 46 are closed, as seen in the lower portion of FIG. 14, the elastomeric sealing members 72 are squeezed together to surround the strands 32 and fill the apertures 36 of the polygrid 30. The opposed sealing members 72 actually flare out slightly to close a small gap 80 of the approximate thickness of the strands 32 which has been provided between the mating mold members at the base of the portion of the mold cavity 48 which forms the stem 63 of the T-shaped frame 62. In this fashion, molten frame-forming material cannot escape to mar the appearance of the finished frame panel.

Figure 15:
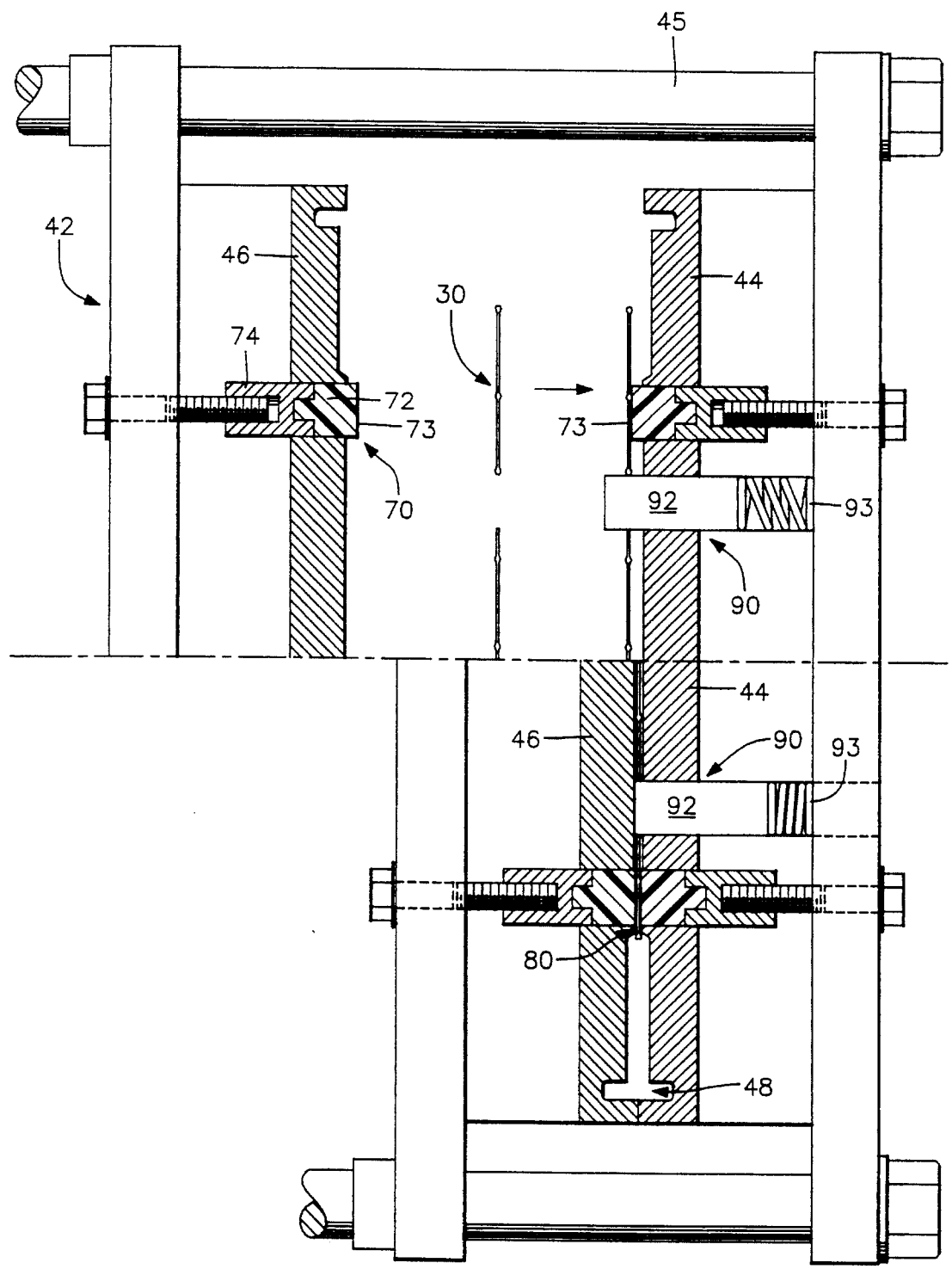
FIG. 15 is a view similar to FIG. 14, but schematically showing the additional use of spring-loaded locating fingers to initially position and slightly tension a grid material within the mold.
Figure 16:
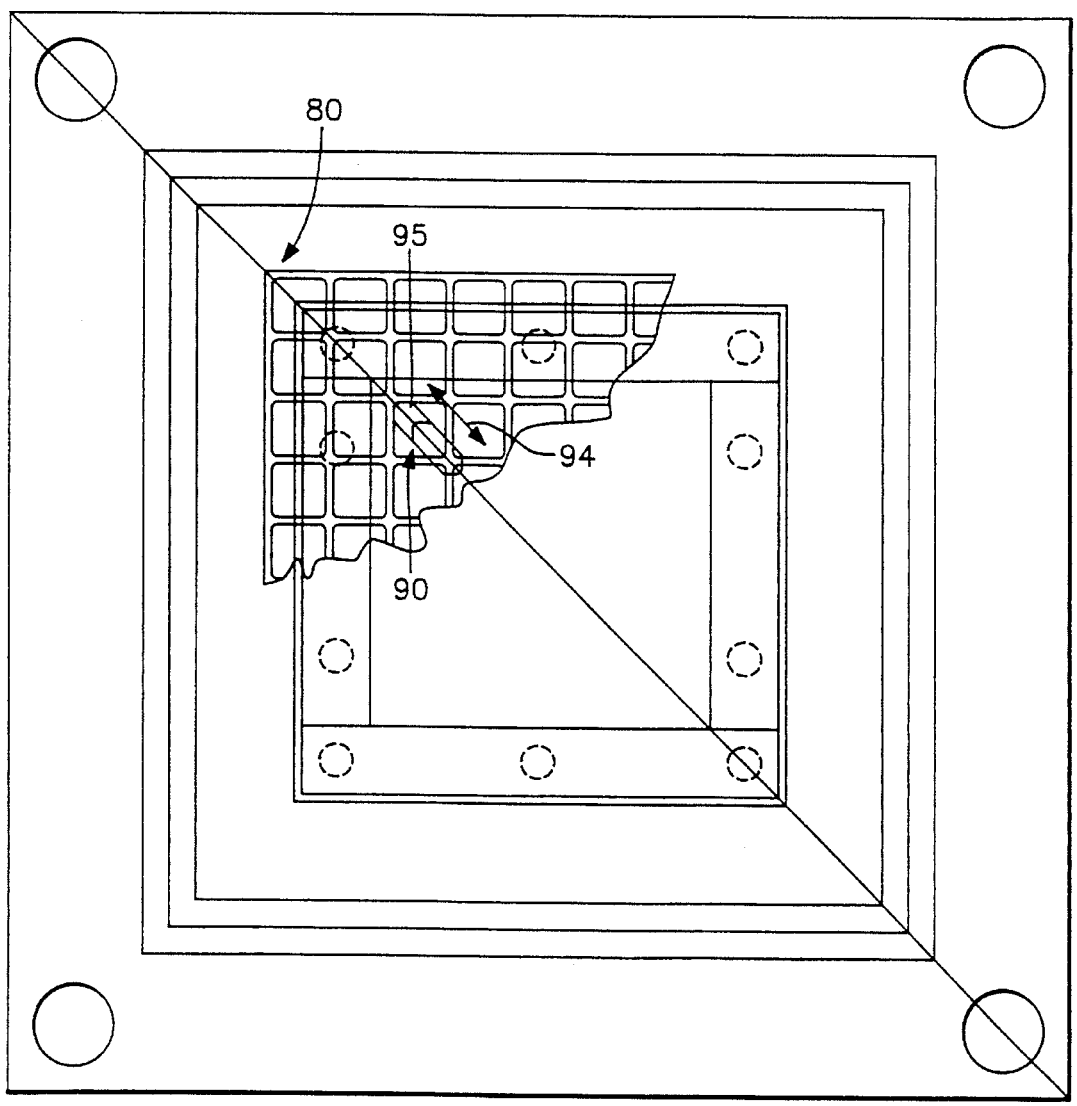
FIG. 16 is an elevational view, partly broken away for illustrative clarity, showing further details of the locating fingers of FIG. 15.

With reference to FIGS. 15 and 16, means designated generally by the reference numeral 90 may be provided for temporarily locating and pre-tensioning the panel-forming polygrid 30 before the mold members 44, 46 are closed for the injection molding process. The locating means 90 may comprise four locator fingers 92 carried by the fixed mold member 44 and biased as by springs 93 to normally extend outwardly of the mating faces thereof, even beyond the face portions 73 of the sealing elements 72 as seen in the upper portion of FIG. 15. When in this position, a grid-like panel-forming means 30 can be positioned over the fingers 92, which can be angularly adjusted as schematically shown by the arrow 94 in FIG. 16 in any conventional manner and fixed in the adjusted position to initially pre-tension the polygrid 30 before the mold members 44, 46 are closed. The adjustment and securing of the locator fingers 92 in position may be manual, spring-pressed or pneumatic. For example, a set screw, not shown, may be used to secure each locator finger 92 along a track 95 for initial tensioning of a polygrid 30 or the like. An abutment may be provided on the moveable mold member 46 to engage the locator fingers 92 as shown in the lower portion of FIG. 15 to depress the locator fingers 92 against the bias of the spring members 93 during the injection molding process.

An alternate panel-forming material and molding technique is shown in FIGS. 9–13. The panel-forming polygrid material 30a has a peripheral selvedge 50a provided with a multiplicity of apertures 51 designed to receive the molten frame-forming material during the injection molding procedure to more securely engage the panel-forming material within the frame 62a in the framed panel 60a seen in FIG. 13. As in the polygrid 30, the strands 32a of the modified polygrid 30a have been stretched to molecularly orient the molecules, permitting tensioning of the panel in the frame by reversion.

Figure 12:
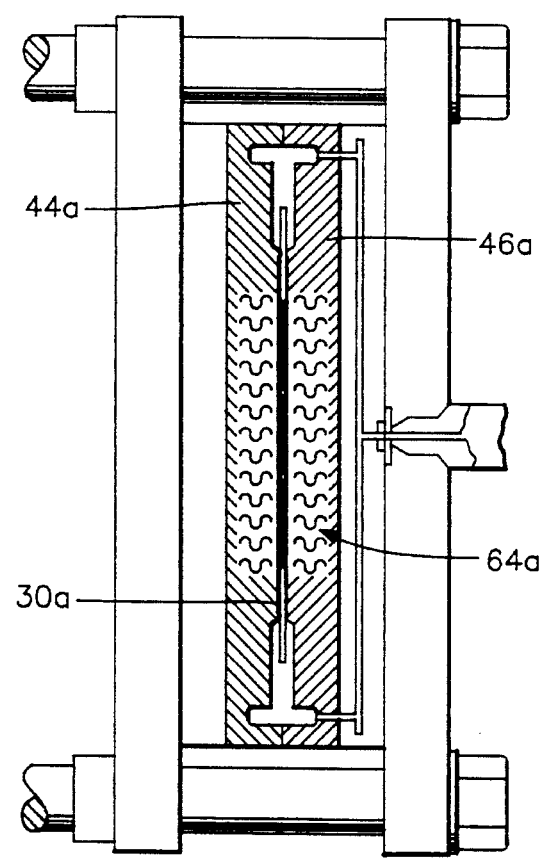
FIG. 12 is a schematic view of the injection molding step using the apparatus of FIG. 12, where the panel-forming material is heated in situ, rather than subsequent to separation from the molding apparatus.
Figure 13:
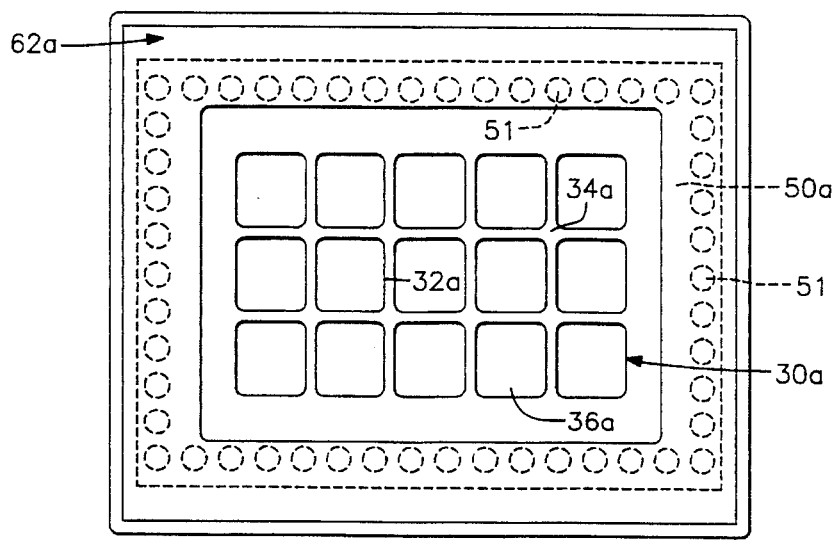
FIG. 13 is an elevational view of a formed panel produced according to the process of FIGS. 9–12 with hidden selvedge portions of the panel-forming material shown in phantom.

A simplified injection molding apparatus 40a is schematically illustrated in FIGS. 11 and 12. With the use of the modified polygrid 30a the elastomeric sealing means 70 is not necessary since the selvedge 50a adequately seals the entire periphery of the mating mold members 44a, 46a against leakage of the molten frame-forming material.

The framed panel 60a may be removed from the mold and separately heated and cooled in the manner shown in FIGS. 6 and 7. Alternatively, heating means schematically illustrated by the wavy lines 64a may be provided to shrink, and thereby tension, the panel-forming means before removing the framed panel 60a from the injection molding equipment 40a. Of course, a similar technique can be use with any panel-forming material such as the polygrid 30 in the earlier embodiments or even a sheet or film-like panel-forming material. Once tensioned in this fashion, the framed panel 60a can be cooled as seen in FIG. 7, although cooling can also be effected without removing the product from the injection molding equipment 40a in a manner similar to the heating step shown in FIG. 12.

If the panel-forming material is sufficiently gripped about its periphery by the molding members as may occur when using a modified polygrid such as shown at 30a, the tensioning heat may be applied simultaneously with the injection molding process. Otherwise, the tensioning heat may be applied after the frame has been set sufficiently to securely grip the peripheral portions of the panel-forming material.

Figure 26:
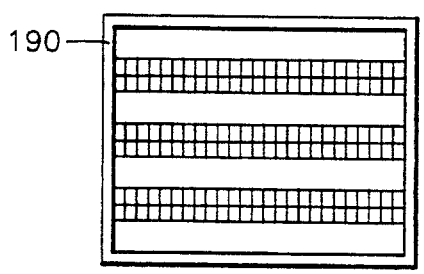
FIGS. 26 through 29 illustrate alternative forms of panel-forming material extending across a rectangular frame, T-shaped in cross-section, for use according to the instant inventive concepts.
Figure 27:
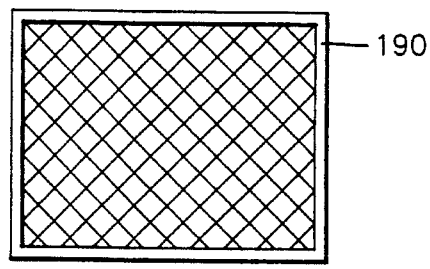

Although a sheet of square mesh polygrid having the strands parallel to the frame edges is shown, the polygrid may be diamond mesh or a square mesh material fixed in the molding apparatus on an angle to form a panel as seen in FIG. 27. Similarly, the frame opening may be covered entirely by the panel-forming material having spaced, alternating strips of grid and solid material to provide a framed panel as shown in FIG. 26.

Figure 17:
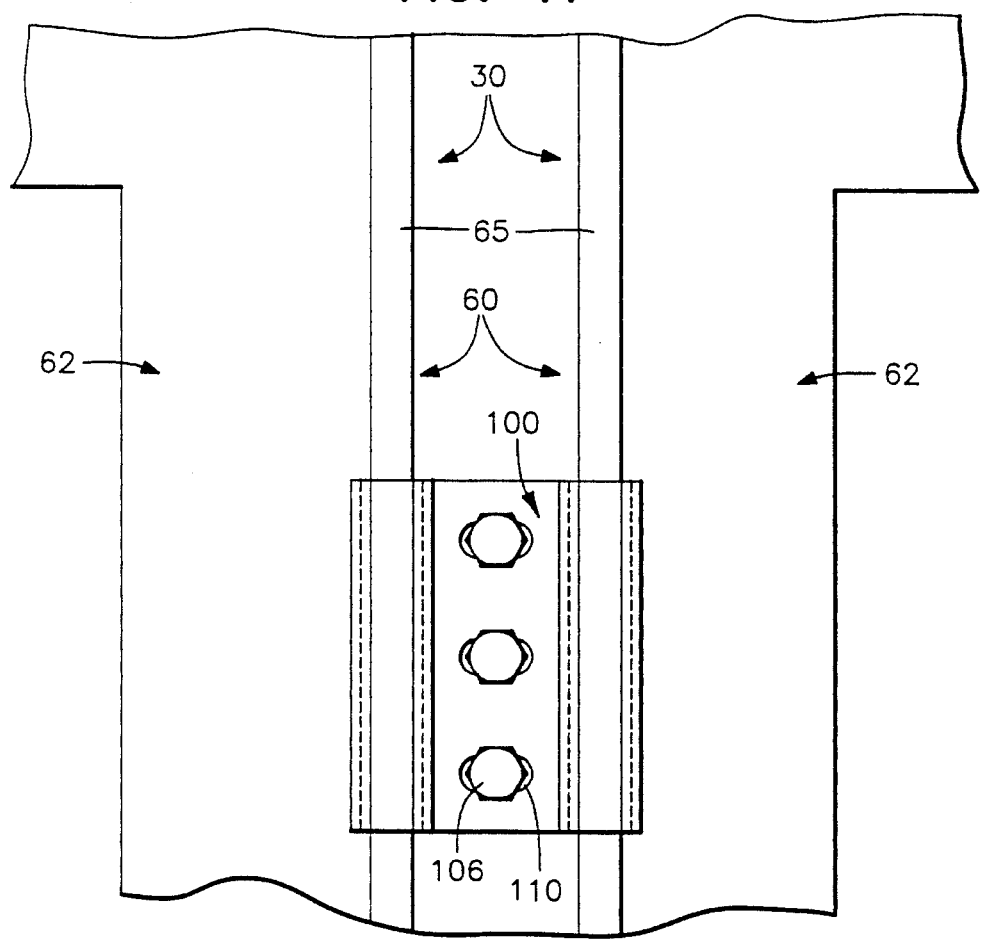
FIG. 17 is a fragmentary front elevational view showing the manner in which a connector element can be used to secure two framed panels to each other.
Figure 18:
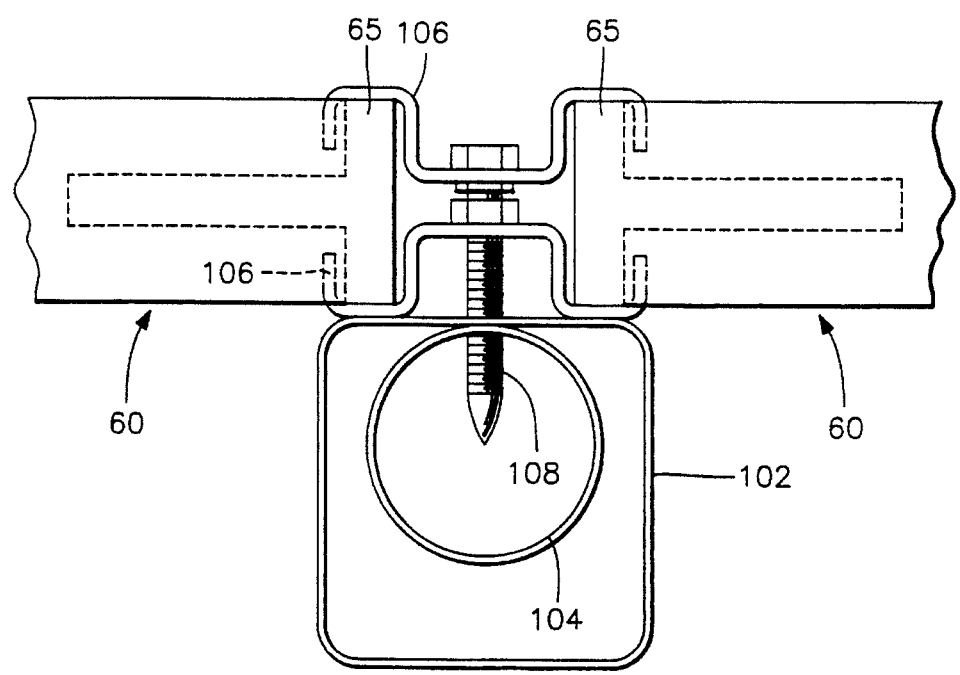
Figure 19:
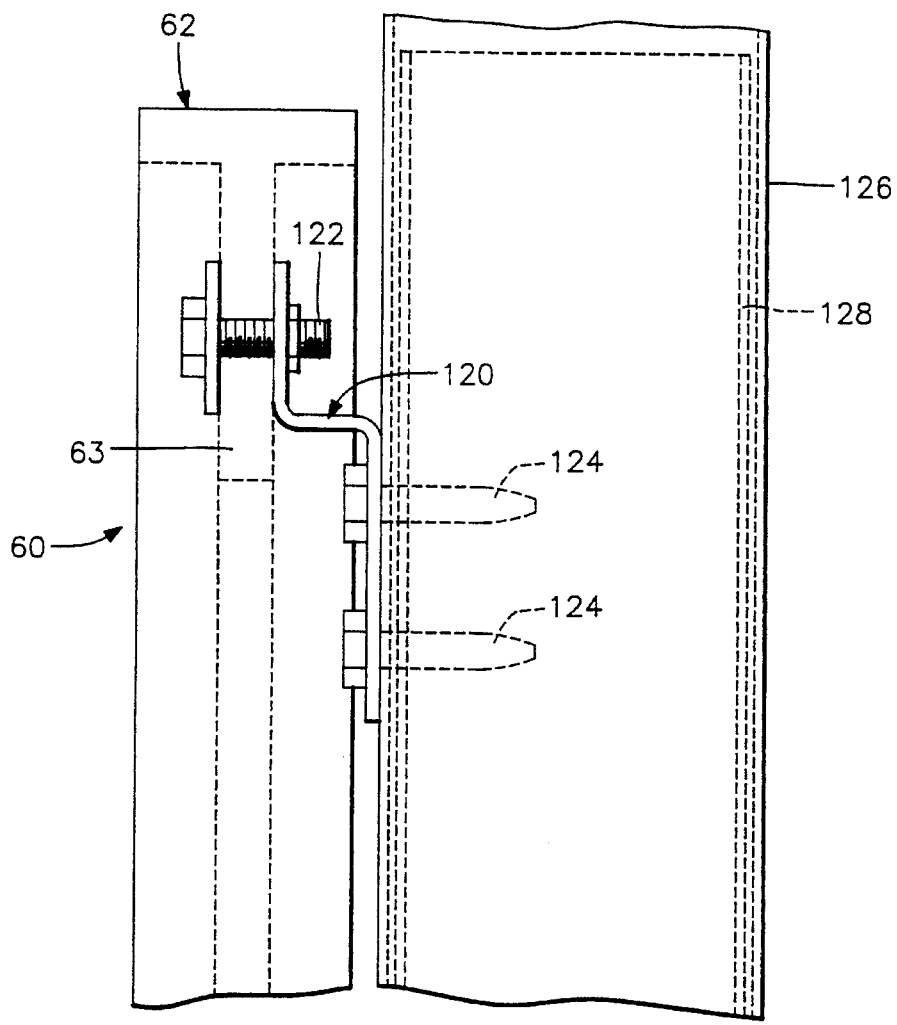
FIG. 19 is a side elevational view illustrating an alternate form of bracket designed to secure a framed panel according to this invention to a support post.
Figure 20:
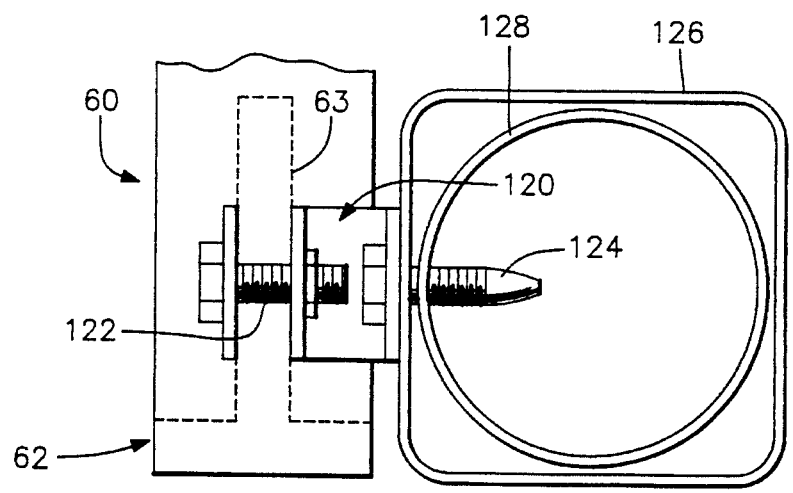
FIG. 20 is a top plan view thereof.

In FIGS. 17 through 22, exemplary connectors for securing framed panels to each other and/or to structural support posts or the like are shown. FIGS. 17 and 18, illustrate the use of a panel-connecting clip 100 to secure a pair of framed panels 60 to each other and to a structural support post 102 which is secured by cement or concrete to an anchor stub post 104. The clip 100 comprises a pair of clip members 106 designed to surround and engage the flange portions 65 of the frames 62 with lag bolts 108 or the like secured through apertures 110 in the clip members 106 to the support post 102. Of course, two or more vertically spaced connecting clips 100 may be provided between each pair of framed panels 60, if necessary, An alternate clip 120 is illustrated in FIGS. 19 and 20 connected at one end by bolts 122 to the stem portion 63 of the frame 62 of a panel 60 and at the other end by lag bolts 124 to a support post 126 and anchor stub post 128.

Figure 21:
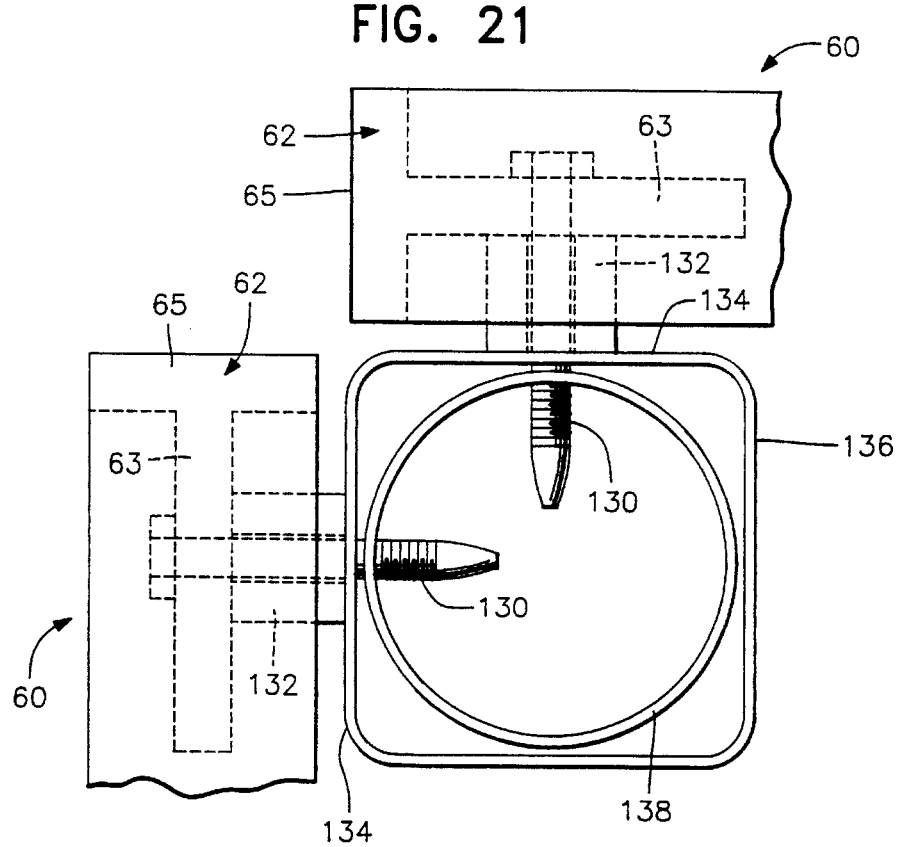
FIG. 21 illustrates yet another way the framed panels of this invention may be secured to a support member.

FIG. 21 illustrates yet another method for securing framed panels 60 to a supporting member. In this embodiment lag bolts 130 extend through stem portions 63 of the frame 62 of panels 30 with a spacer 132 surrounding the shaft of the bolts 130. The spacer 132 engages the stem portions 63 and flat sidewalls 134 of a structural support post 136 for anchoring the panels 30 to the post 136 and anchor stub post 138.

Figure 22:
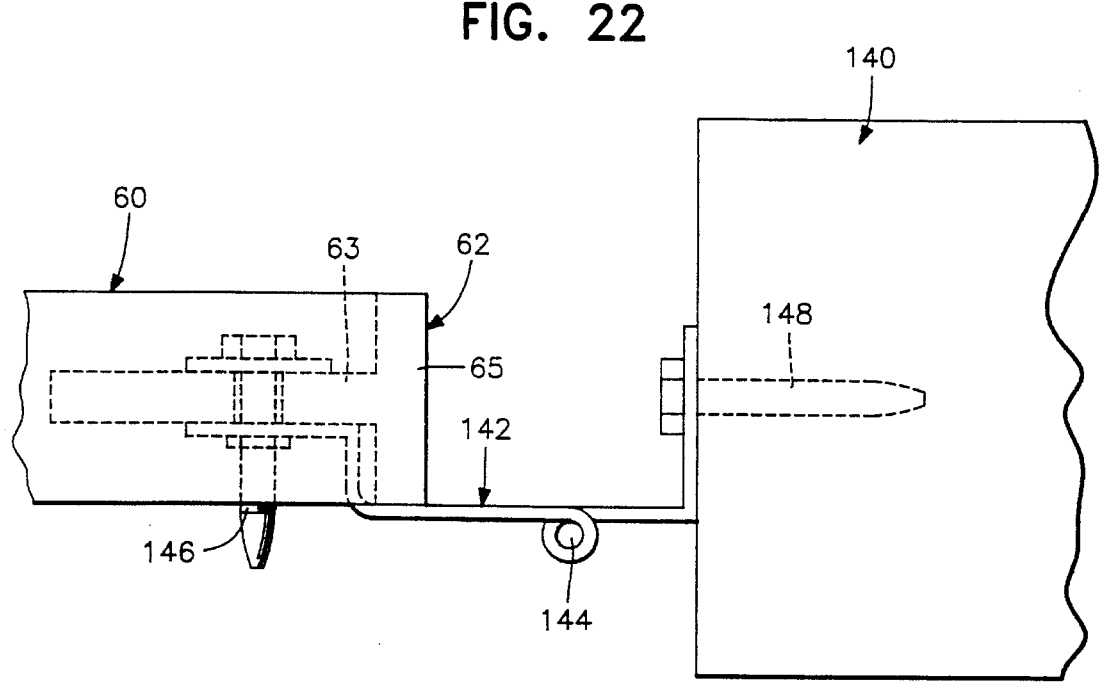
FIG. 22 illustrates a hinge mechanism which may be used to secure a framed panel utilized as a gate to a support post.

In FIG. 22, a framed panel 60 used as a gate or the like is secured to a support post 140 by a connector 142 incorporating a hinge means 144. A bolt 146 anchors one end of the connector 142 to the stem portion 63 of the frame 62 and a lag bolt 148 secures the other end of the connector 142 to the support post 140.

The connectors shown in FIGS. 17–22 illustrate the versatility of the framed panels produced according to this invention. The relatively rigid T-shaped structural foam frame provides stability to the panels and enables on-site interconnection of the panels to each other and/or to supporting means in the nature of posts, beams, walls or other structures in a quick and simple manner.

It is possible to quickly and easily erect a permanent or temporary fence or the like on site from a multiplicity of framed panels according to this invention. For example, a multiplicity of panels may be laid horizontally along a proposed fence line and secured to each other as by connecting clips 100. Hollow structural posts 102 can be secured to the panels at spaced locations and short anchor stub posts 104, approximately three feet long, made of pipe or angle iron may be driven approximately two feet into the ground at each post location.

The pre-assembled plurality of panel sections may then be lifted to a vertical position and lowered over the portions of the stub posts 104 extending above the ground and aligned in their final position. The panel sections may then be secured in place by pouring a sufficient amount of pre-mixed concrete into each hollow support post 102 up to the top of the projecting portions of its post stub 104. In an abundance of caution, the support posts 102 may be completely filled with concrete for an even greater degree of rigidity and permanence. It is not necessary that the post stubs be anchored in a vertical orientation. The internal dimensions of the support post are sufficient to locate the support post on top of the post stubs and be aligned at a desired angle, preferably vertically.

Figure 23:
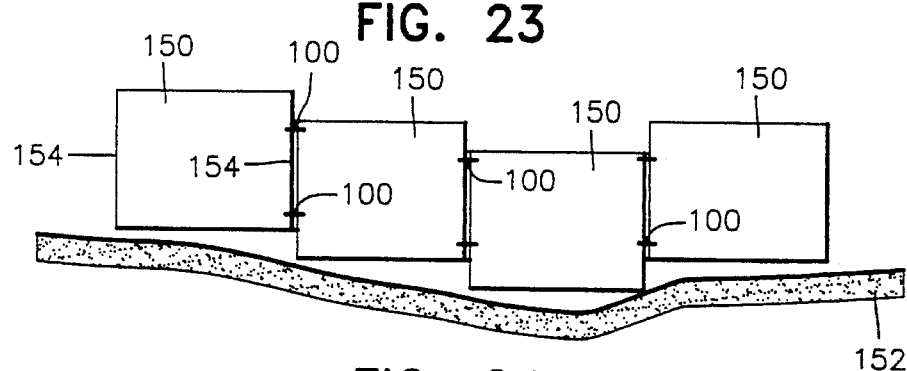
FIG. 23 illustrates a plurality of framed panels of this invention interconnected to each other at varying heights to extend along an uneven terrain.
Figure 24:
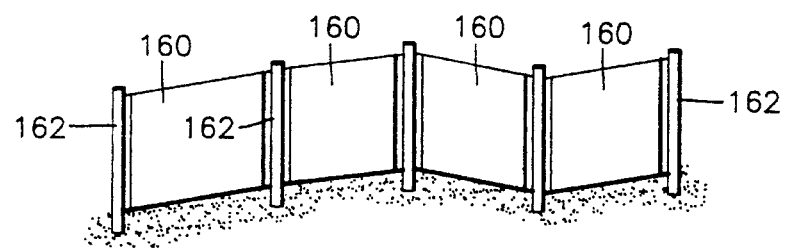
FIG. 24 illustrates a plurality of frame panels of this invention secured to structural support posts located between adjacent framed panels.
Figure 25:
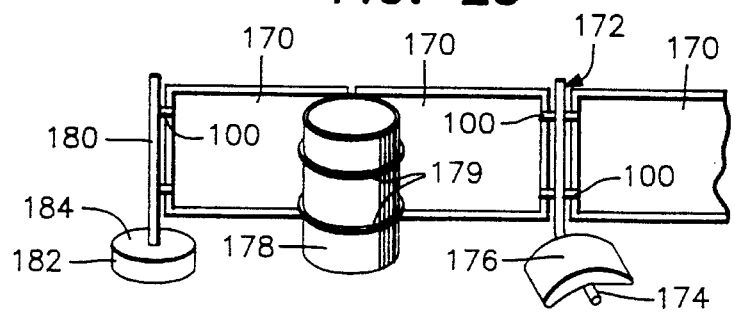
FIG. 25 illustrates a plurality of framed panels of this invention secured to alternative support structures located between adjacent framed panels.

In FIGS. 23 through 25, several embodiments of interconnected framed panels according to this invention are schematically shown as forming exemplary temporary or permanent fences or barriers. In the embodiments shown in FIGS. 23 through 25, the panel-forming material is omitted, it being understood that any of the suggested panel-forming material set forth in this specification may be used.

The manner in which a plurality of adjacent framed panels 150 may be interconnected for use in forming a fence for an uneven terrain is illustrated schematically in FIG. 23. Panel connecting clips 100, for example, as shown in FIG. 17, may be used to secure adjacent framed panels 150 to each other with the height of the panels varied to correspond to the rise and fall of an uneven terrain 152. Since it is possible to position connector clips 100, or any other suitable connector, to the T-shaped peripheral flange portions 154 of the framed panels 150 at any height, a varied height fence or barrier as shown in FIG. 23 is simple to construct in situ.

The unique framed panels 160 of this invention may also be connected to each other in various angular relationships as seen in FIG. 24. The framed panels 160 are secured to supporting members 162, for example structural posts, and preferably cylindrical support posts, as shown in FIGS. 17 through 22 by the use of any of the disclosed connectors to form a fence or barrier of any predetermined pattern.

While the construction of a fence or barrier as seen in FIG. 24 is of a fairly permanent nature, various alternative means may be provided as illustrated schematically in FIG. 25 to produce a temporary structure capable of being quickly and efficiently assembled and disassembled. For example, a plurality of framed panels 170 may be connected to interposed structural support members such as the L-shaped support post 172 which includes a leg portion 174 held in place by a sand bag 176 or the like. Alternatively, adjacent framed panels 170 may be secured together and connected to a 55-gallon drum 178, for example, by the connectors secured to straps 179. In still another alternative, a structural support post 180 may be anchored in a weighted base such as a tire 182 filled with cement 184 or the like. The formed panels 170 of the assembly shown in FIG. 25 may be readily disassembled and moved to a new location for connection to other available structural support members.

In FIGS. 26 through 29, frames 190 having a T-shape configuration, as described and shown in any of the foregoing embodiments, are provided with alternative panel-forming material which may extend completely across the frame to form barriers or guards. However, in FIG. 26 the panel-forming material is a sheet having alternating strips of solid strip portions 192 and grid strip portions 194.

The framed panels may be used as guards or barriers attached to the side or back edge of a shelf as in a warehouse or superstore to preclude merchandise from falling from the shelf. Likewise, framed panels can be secured to the sidewall or frame of a conveyor belt to restrain the movement of products being conveyed thereon. The framed panels of this invention can also be secured to floors or walls to form separators or dividers in supermarkets and other retail establishments or to form a guard rail to prevent access to potentially dangerous machinery. The framed panels of this invention are more light weight, less expensive to manufacture and, yet, stronger than known materials currently available for similar applications.

Figure 28:
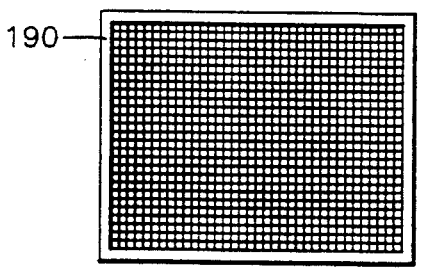
Figure 29:
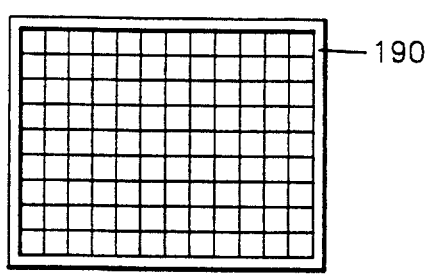

The T-shaped frame may also contain a filter material illustrated schematically in FIG. 28 for use in filter units or the like in a known manner. Other uses of these frames will be readily recognized by those of ordinary sill and the foregoing are merely intended to be illustrative of the versatility of the instant inventive concepts, and not limiting thereon.

Figure 30:
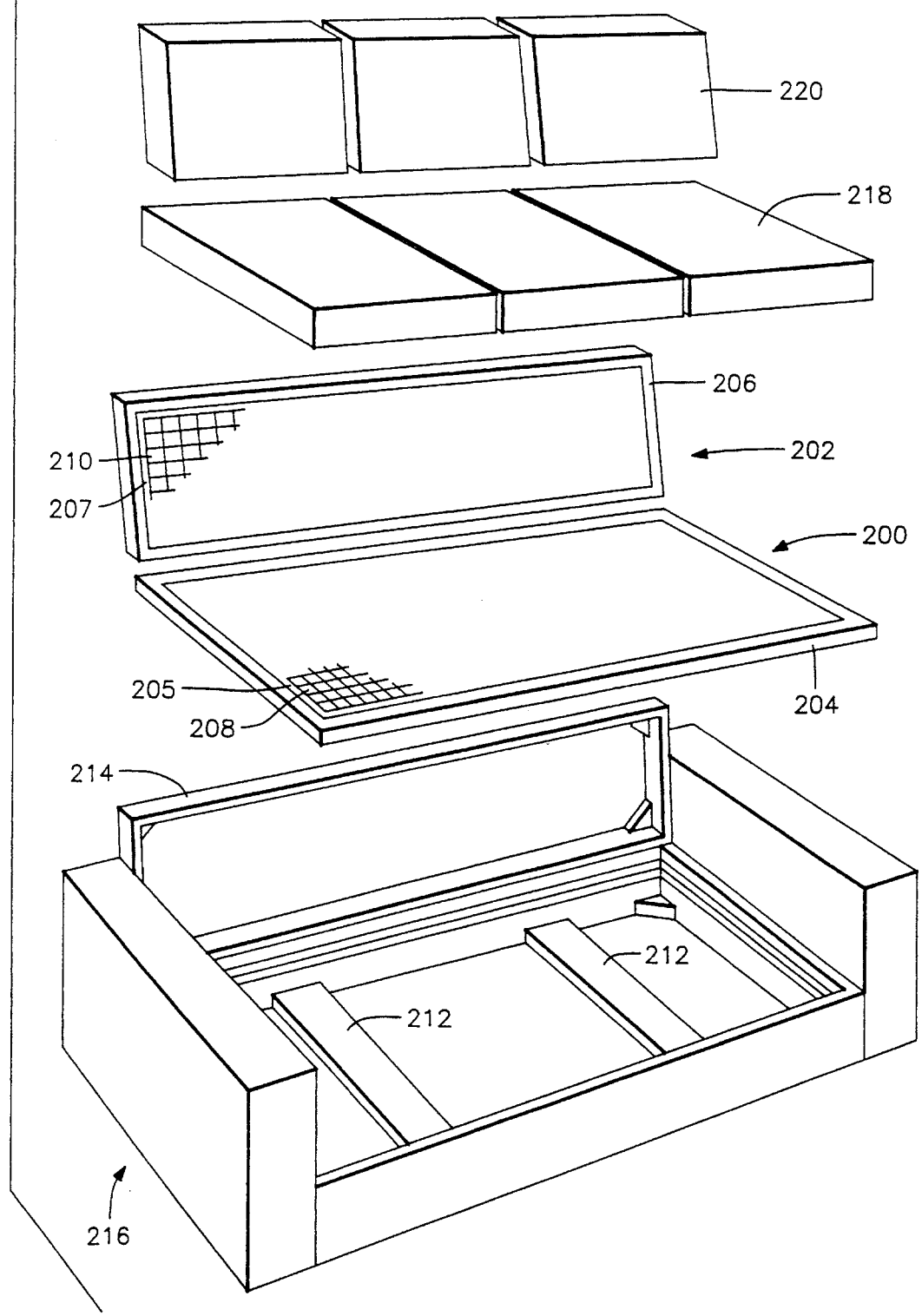
FIG. 30 is an exploded view of a couch including a framed panel of this invention used as a cushion support.
Figure 31:
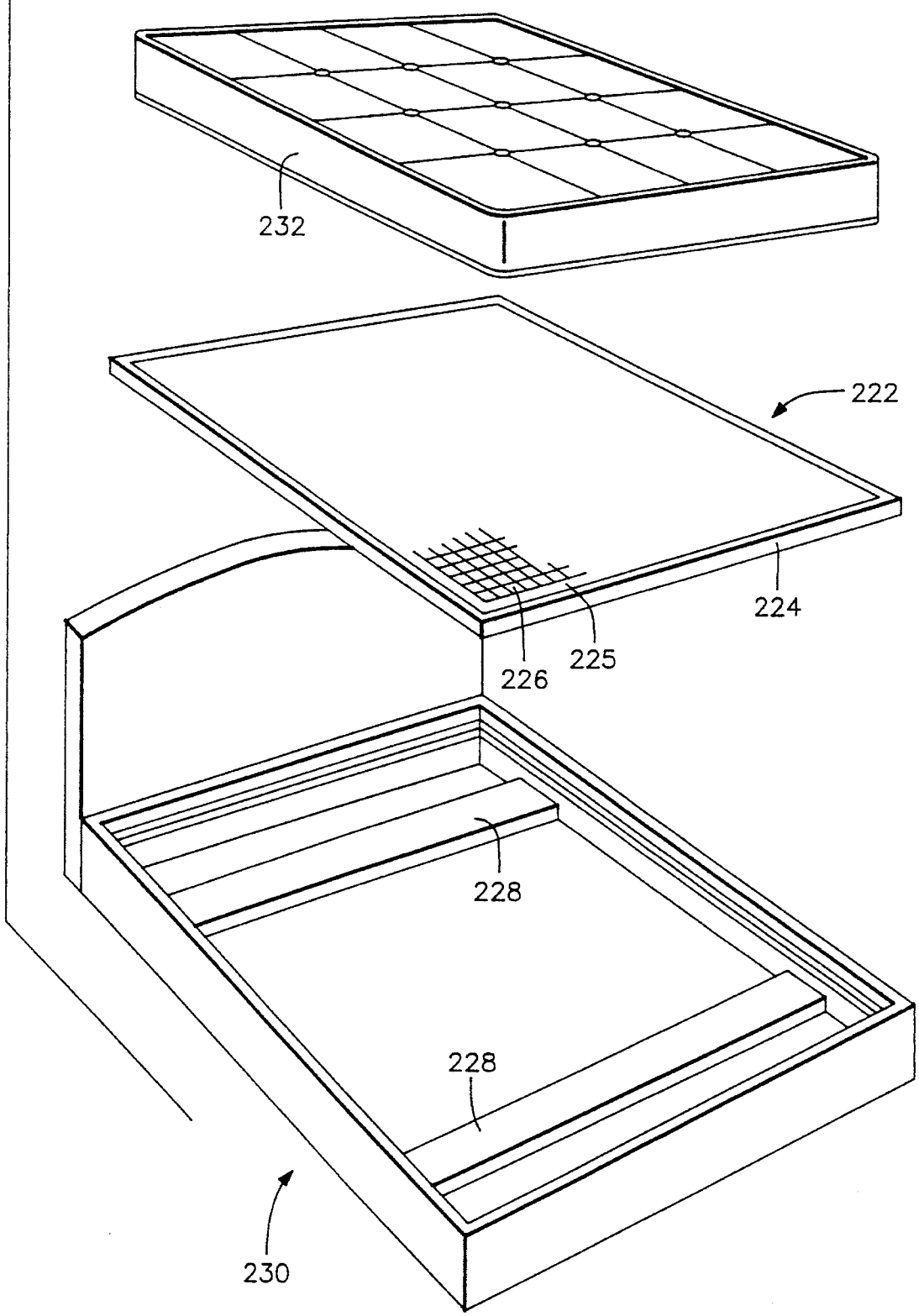
FIG. 31 is an exploded view of a bed including a framed panel of this invention used as a mattress support.

Alternatively, the T-shaped frame may be used to secure panel-forming material for use as a seat or back support as shown in FIG. 30 or a bedding support as shown in FIG. 31.

In FIG. 30, two panels 200, 202 having T-shaped frames 204, 206, respectively, include panel-forming material 208, 210 extending across the frames 204, 206, respectively. The framed panels 200, 202 are inserted across bottom supports 212 and back supports 214 of a couch 216. Cushions 218 and 220 are positioned next to the framed panels 200, 202, respectively, to form a couch. The tensioned panel-forming material 208, 210 provides a springy support for the cushions 218, 220.

Similarly, as shown in FIG. 31, a framed panel 222, including a T-shaped frame 224 having panel-forming material 226 extending across the frame 224, forms a support positioned on bed slats 228 of a bed frame 230. A mattress 232 is placed on top of the framed panel 222 to form a complete bed unit. The framed panel 222 acts as a box spring to resiliently support the mattress 232.

The frame members 204,206,224 shown in FIGS. 30 and 31 are made according to the process described with reference to FIGS. 1 through 17. Accordingly, each frame member has a T-shape configuration with a projecting portion 205, 207,225 of each frame forming the base portion of a "T" and extending toward a center of each framed panel. The panel-forming material 208, 210, 226 extends across the frame and into projecting portions 205, 207,225 and is tensioned by heating to cause reversion as explained above. This produces a construction wherein the panel-forming material extends in a single plane even at its peripheral edge portions captured by the frame to provide a uniformly supported panel-forming material and to avoid potential weakened stress points which may be encountered by a terminal peripheral portion of the panel-forming material bending at the frame with respect to the portion of the panel-forming material extending across the frame as is common in some prior art tensioning means.

The projecting portions 205, 207, 225 extending from a main body of the T-shaped frame form a lip with respect to a remainder of the T-shaped frame. This forms a recess which may be used to support a cushion or mattress as shown in FIGS. 30 and 31 when the cushions or mattress are sized to be received within the recess defined by the main body of the T-shaped frame and the recessed lip formed by the projecting portions 205, 207, 225.

Having described the invention, many modifications thereto will become apparent to those skilled in the art to which it pertains without deviation from the spirit of the invention as defined by the scope of the appended claims.

What is claimed is:

1. A method for making a framed panel comprising:

providing a thermoplastic panel-forming material including central panel portions and peripheral portions surrounding said panel portions, at least part of said panel portions being molecularly oriented, said panel-forming material being a polygrid comprising molecularly oriented strands interconnected by less oriented junctions, said strands and junctions together defining a multiplicity of grid openings;

securing said peripheral portions of said panel-forming material in a rigid frame;

heating the molecularly oriented panel portions sufficiently to cause same to shrink and thereby tension said panel-forming material within said frame; and solidifying said panel-forming material in said tensioned condition.

2. The method of claim 1, wherein said molecularly oriented parts of said panel-forming material are formed by preliminarily stretching said parts below the glass transition temperature of said thermoplastic material to orient the molecules therein.

3. The method of claim 2, wherein said thermoplastic panel-forming material is a polyolefin.

4. The method of claim 3, wherein said polyolefin is polypropylene.

5. The method of claim 1, wherein said securing step includes molding said rigid frame about said peripheral portions of said panel-forming material.

6. The method of claim 5, wherein said rigid frame is formed of a structural polymeric foam.

7. The method of claim 6, wherein said structural foam is injection molded about said peripheral portions of said panel-forming material.

8. The method of claim 1, wherein said securing step includes capturing said peripheral portions of said panel-forming material between mating faces of opposed mold members which together define a peripheral frame-forming mold cavity about said peripheral portions, injecting a molten frame-forming polymer into said mold cavity, and solidifying said frame-forming polymer therein.

9. The method of claim 8, further comprising slightly spacing the mating faces of said opposed mold members to provide a small gap to accommodate the thickness of the polygrid at the point where the peripheral portions thereof enter said mold cavity, providing elastomeric sealing means adjacent said gap, and squeezing portions of said sealing means into said gap prior to injection molten frame-forming material into said mold cavity.

10. The method of claim 8, wherein only said central panel portions of said panel-forming material comprise molecularly oriented strands interconnected by less oriented junctions said strands and junctions together defining a multiplicity of grid openings, and said peripheral portions comprise a substantially unoriented selvedge.

11. The method of claim 10, further comprising a multiplicity of apertures defined in said selvedge, and wherein said molten frame-forming material is extruded into and through said apertures to increase the connection of the panel to the frame.

12. A method for making a framed panel comprising:

providing a thermoplastic panel-forming material including central panel portions and peripheral portions surrounding said panel portions, at least part of said panel portions being molecularly oriented, said panel-forming material being a polygrid comprising molecularly oriented strands interconnected by less oriented junctions, said strands and junctions together defining grid openings;

capturing said peripheral portions of said panel-forming material between mating faces of opposed mold members which together define a peripheral frame-forming mold cavity about said peripheral portions;

injecting a molten frame-forming polymer into said mold cavity;

solidifying said frame-forming polymer therein to form a frame;

heating the molecularly oriented panel portions sufficiently to cause same to shrink and thereby tension said panel-forming material within said frame; and solidifying said panel-forming material in said tensioned condition.

13. The method of claim 12, wherein said molecularly oriented parts of said panel-forming material are formed by preliminarily stretching said parts below the glass transition temperature of said thermoplastic material to orient the molecules therein.

14. The method of claim 13, wherein said thermoplastic panel-forming material is a polyolefin.

15. The method of claim 14, wherein said polyolefin is polypropylene.

16. The method of claim 15, further comprising slightly spacing the mating faces of said opposed mold members to provide a small gap to accommodate the thickness of the polygrid at the point where the peripheral portions thereof enter said mold cavity, providing elastomeric sealing means adjacent said gap, and squeezing portions of said sealing means into said gap prior to injection molten frame-forming material into said mold cavity.

17. A method for making a framed panel comprising:

providing a thermoplastic panel-forming material including central panel portions and peripheral portions surrounding said panel portions, at least part of said panel portions being molecularly oriented, said central panel portions of said panel-forming material comprising molecularly oriented strands interconnected by less oriented junctions, said strands and junctions together defining a multiplicity of grid openings, and said peripheral portions comprise a substantially unoriented selvedge;

capturing said peripheral portions of said panel-forming material between mating faces of opposed mold members which together define a peripheral frame-forming mold cavity about said peripheral portions;

injecting a molten frame-forming polymer into said mold cavity;

solidifying said frame-forming polymer therein to form a frame;

heating the molecularly oriented panel portions sufficiently to cause same to shrink and thereby tension said panel-forming material within said frame; and solidifying said panel-forming material in said tensioned condition.

18. The method of claim 17, wherein said molecularly oriented parts of said panel-forming material are formed by preliminarily stretching said parts below the glass transition temperature of said thermoplastic material to orient the molecules therein.

19. The method of claim 18, wherein said thermoplastic panel-forming material is a polyolefin.

20. The method of claim 19, wherein said polyolefin is polypropylene.

21. The method of claim 17, further comprising slightly spacing the mating faces of said opposed mold members to provide a small gap to accommodate the thickness of the polygrid at the point where the peripheral portions thereof enter said mold cavity, providing elastomeric sealing means adjacent said gap, and squeezing portions of said sealing means into said gap prior to injecting molten frame-forming material into said mold cavity.

22. The method of claim 17, further comprising a multiplicity of apertures defined in said selvedge, and wherein said molten frame-forming material is extruded into and through said apertures to increase the connection of the panel to the frame.

23. A method for making a framed panel comprising:
providing a thermoplastic panel-forming material including central panel portions and peripheral portions surrounding said panel portions, at least part of said panel portions being molecularly oriented, said central panel portions being a polygrid comprising molecularly oriented strands interconnected by less oriented junctions, said strands and junctions together defining a multiplicity of grid openings;
securing said peripheral portions of said panel-forming material in a rigid frame;
heating the molecularly oriented panel portions sufficiently to cause same to shrink and thereby tension said panel-forming material within said frame; and
solidifying said panel-forming material in said tensioned condition.

24. The method of claim 23, wherein said molecularly oriented parts of said panel-forming material are formed by preliminarily stretching said parts below the glass transition temperature of said thermoplastic material to orient the molecules therein.

25. The method of claim 24, wherein said thermoplastic panel-forming material is a polyolefin.

26. The method of claim 25, wherein said polyolefin is polypropylene.

27. The method of claim 23, wherein said securing step includes molding said rigid frame about said peripheral portions of said panel-forming material.

28. The method of claim 27, wherein said rigid frame is formed of a structural polymeric foam.

29. The method of claim 28, wherein said structural foam is injection molded about said peripheral portions of said panel-forming material.

30. The method of claim 23, wherein said securing step includes capturing said peripheral portions of said panel-forming material between mating faces of opposed mold members which together define a peripheral frame-forming mold cavity about said peripheral portions, injecting a molten frame-forming polymer into said mold cavity, and solidifying said frame-forming polymer therein.

31. The method of claim 30, further comprising slightly spacing the mating faces of said opposed mold members to provide a small gap to accommodate the thickness of the panel forming material at the point where the peripheral portions thereof enter said mold cavity, providing elastomeric sealing means adjacent said gap, and squeezing portions of said sealing means into said gap prior to injecting molten frame-forming material into said mold cavity.

32. The method of claim 23, wherein said peripheral portions comprise a substantially unoriented selvedge.

33. The method of claim 32, further comprising a multiplicity of apertures defined in said selvedge, and wherein said molten frame-forming material is extruded into and through said apertures to increase the connection of the panel to the frame.

34. A method for making a framed panel comprising:
providing a thermoplastic panel-forming material including central panel portions and peripheral portions surrounding said panel portions, at least part of said panel portions being molecularly oriented;
capturing said peripheral portions of said panel-forming material between mating faces of opposed mold members which together define a peripheral frame-forming mold cavity about said peripheral portions;
injecting a molten frame-forming polymer into said mold cavity;
solidifying said frame-forming polymer therein to form a rigid frame;
heating the molecularly oriented panel portions sufficiently to cause same to shrink and thereby tension said panel-forming material within said frame; and
solidifying said panel-forming material in said tensioned condition.

35. The method of claim 34, wherein said molecularly oriented parts of said panel-forming material are formed by preliminarily stretching said parts below the glass transition temperature of said thermoplastic material to orient the molecules therein.

36. The method of claim 35, wherein said thermoplastic panel-forming material is a polyolefin.

37. The method of claim 36, wherein said polyolefin is polypropylene.

38. The method of claim 34, wherein said panel-forming material is a polygrid comprising molecularly oriented strands interconnected by less oriented junctions, said strands and junctions together defining a multiplicity of grid openings.

39. The method of claim 34, wherein said panel-forming material is a thermoplastic sheet.

40. The method of claim 34, wherein said rigid frame is formed of a structural polymeric foam.

41. The method of claim 34, wherein said panel-forming material is a polygrid comprising molecularly oriented strands interconnected by less oriented junctions, said strands and junctions together defining grid openings.

42. The method of claim 41, further comprising slightly spacing the mating faces of said opposed mold members to provide a small gap to accommodate the thickness of the polygrid forming material at the point where the peripheral portions thereof enter said mold cavity, providing elastomeric sealing means adjacent said gap, and squeezing portions of said sealing means into said gap prior to injection molting frame-forming material into said mold cavity.

43. The method of claim 34, wherein said central panel portions of said panel-forming material comprise molecularly oriented strands interconnected by less oriented junctions said strands and junctions together defining a multiplicity of grid openings, and said peripheral portions comprise a substantially unoriented selvedge.

44. The method of claim 43, further comprising a multiplicity of apertures defined in said selvedge, and wherein said molten frame-forming material is extruded into and through said apertures to increase the connection of the panel to the frame.

45. A method for making a framed panel comprising:

providing a thermoplastic panel-forming material including central panel portions and peripheral portions surrounding said panel portions, at least part of said panel portions being molecularly oriented, said panel-forming material being a polygrid comprising molecularly oriented strands interconnected by less oriented junctions, said strands and junctions together defining a multiplicity of grid openings;

forming a rigid frame and embedding said peripheral portions of said panel-forming material in said rigid frame during formation of said rigid frame;

heating the molecularly oriented panel portions sufficiently to cause same to shrink and thereby tension said panel-forming material within said frame; and solidifying said panel-forming material in said tensioned condition.

46. The method of claim 45, wherein said molecularly oriented parts of said panel-forming material are formed by preliminarily stretching said parts below the glass transition temperature of said thermoplastic material to orient the molecules therein.

47. The method of claim 46, wherein said thermoplastic panel-forming material is a polyolefin.

48. The method of claim 47, wherein said polyolefin is polypropylene.

49. The method of claim 45, wherein said panel-forming material is a thermoplastic sheet.

50. The method of claim 45, wherein said forming step includes molding said rigid frame about said peripheral portions of said panel-forming material.

51. The method of claim 50, wherein said rigid frame is formed of a structural polymeric foam.

52. The method of claim 51, wherein said structural foam is injection molded about said peripheral portions of said panel-forming material.

53. A method for making a framed panel comprising:

providing a thermoplastic panel-forming material including central panel portions and peripheral portions surrounding said panel portions, at least part of said panel portions being molecularly oriented, said panel-forming material being a polygrid comprising molecularly oriented strands interconnected by less oriented junctions, said strands and junctions together defining grid openings;

forming a rigid frame and embedding said peripheral portions of said panel-forming material in said rigid frame during formation of said rigid frame, said forming step including capturing said peripheral portions of said panel-forming material between mating faces of opposed mold members which together define a peripheral frame-forming mold cavity about said peripheral portions, injecting a molten frame-forming polymer into said mold cavity, and solidifying said frame-forming polymer therein;

heating the molecularly oriented panel portions sufficiently to cause same to shrink and thereby tension said panel-forming material within said frame; and solidifying said panel-forming material in said tensioned condition.

54. The method of claim 53, further comprising slightly spacing the mating faces of said opposed mold members to provide a small gap to accommodate the thickness of the polygrid at the point where the peripheral portions thereof enter said mold cavity providing elastomeric sealing means adjacent said gap, and squeezing portions of said sealing means into said gap prior to injecting molten frame-forming material into said mold cavity.

55. A method for making a framed panel comprising:

providing a thermoplastic panel-forming material including central panel portions and peripheral portions surrounding said panel portions, at least part of said panel portions being molecularly oriented, said central panel portions of said panel-forming material comprising molecularly oriented strands interconnected by less oriented junctions, said strands and junctions together defining a multiplicity of grid openings, and said peripheral portions comprise a substantially unoriented selvedge;

forming a rigid frame and embedding said peripheral portions of said panel-forming material in said rigid frame during formation of said rigid frame, said forming step including capturing said peripheral portions of said panel-forming material between mating faces of opposed mold members which together define a peripheral frame-forming mold cavity about said peripheral portions, injecting a molten frame-forming polymer into said mold cavity, and solidifying said frame-forming polymer therein;

heating the molecularly oriented panel portions sufficiently to cause same to shrink and thereby tension said panel-forming material within said frame; and solidifying said panel-forming material in said tensioned condition.

56. The method of claim 55, further comprising a multiplicity of apertures defined in said selvedge, and wherein said molten frame-forming material is extruded into and through said apertures to increase the connection of the panel to the frame.

* * * * *